Aug. 20, 1940. C. F. SCHMIDT Re. 21,537

POTATO PLANTER

Original Filed July 16, 1937 3 Sheets-Sheet 1

Inventor

Charles F. Schmidt

By Wm. D. Hodges

Attorney

Aug. 20, 1940. C. F. SCHMIDT Re. 21,537
POTATO PLANTER
Original Filed July 16, 1937 3 Sheets-Sheet 2
Fig. 2.
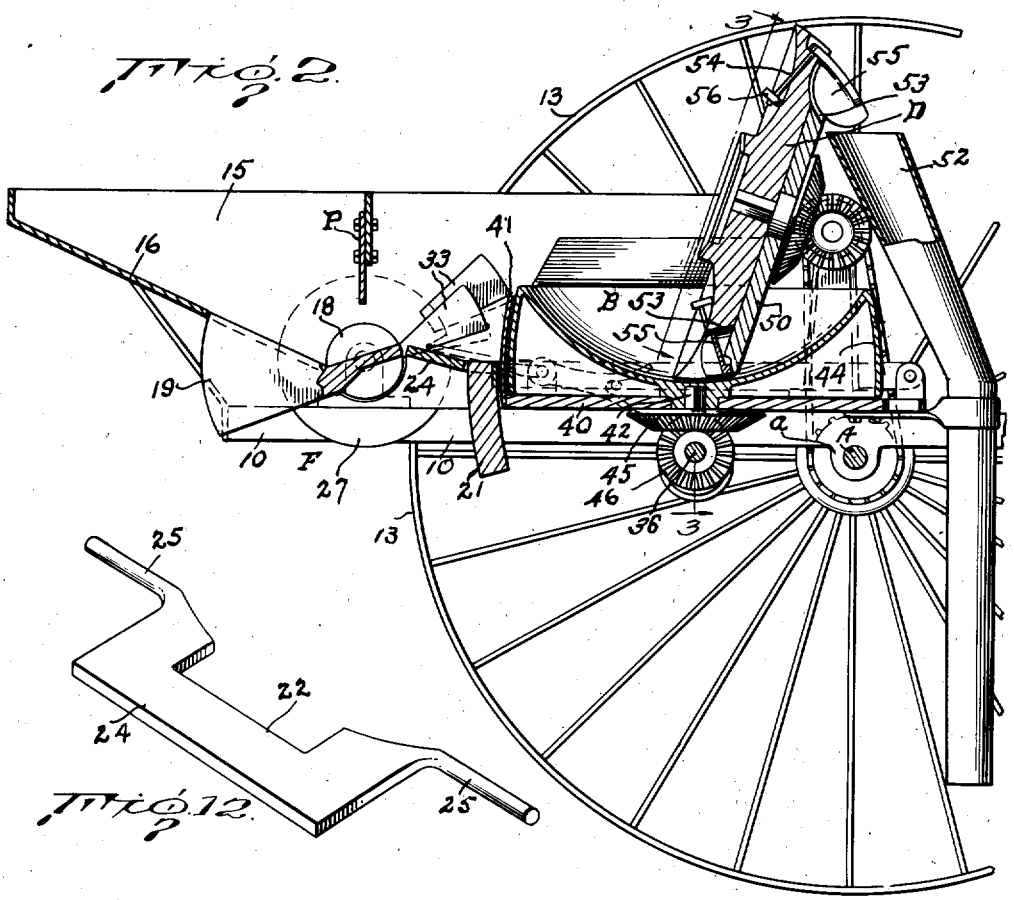
Fig. 12.
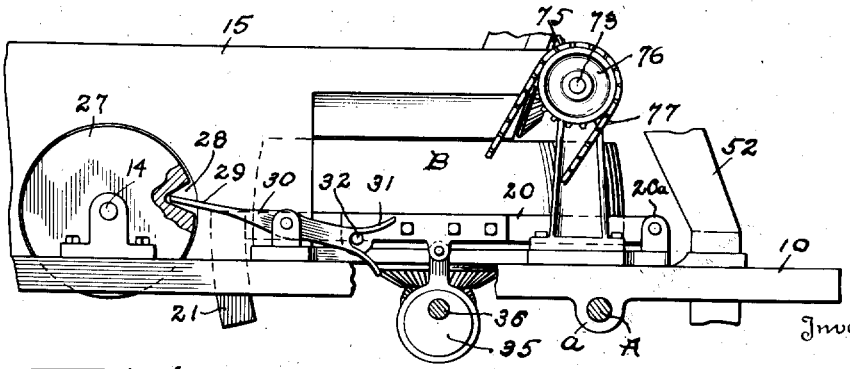
Fig. 4.
Inventor
Charles F. Schmidt
By Wm. E. Hodges
Attorney Aug. 20, 1940. C. F. SCHMIDT Re. 21,537

POTATO PLANTER

Original Filed July 16, 1937 3 Sheets-Sheet 3

Inventor

Charles F. Schmidt

By Wm. E. Hodges

Attorney

Reissued Aug. 20, 1940

Re. 21,537

UNITED STATES PATENT OFFICE 21,537

POTATO PLANTER

Charles F. Schmidt, Jeffersontown, Ky.

Original No. 2,166,732, dated July 18, 1939, Serial No. 154,067, July 16, 1937. Application for reissue May 15, 1940, Serial No. 335,425

22 Claims. (Cl. 221—135)

This invention is a planter of the type primarily adapted for the planting of potatoes.

One of the objects of the invention is to provide a planter of the character mentioned, in which the seeds may be individually fed from a pile of seeds, and transferred to the inlet end of a discharge hopper. A further object is to provide an improved carrier wheel having pockets therein, each pocket being so constructed and arranged as to receive and transport an individual seed from a receiving bowl, said pockets each having a movable wall, and means for periodically moving said wall to release the seed in such manner that it will drop into the discharge hopper. A further object is to provide feeding mechanism including a supply bin, a seed-receiving bowl, and simple means for feeding seed one at a time from the supply bin to the receiving bowl without injury to the seed. A further object is to provide simple and efficient means for transferring the seeds from the receiving basin to the pockets of the carrier wheel. A further object is to provide the carrier wheel with spring pressed closure members normally biased to move to an open position, and means normally acting to hold said closures in closed position, said holding means being constructed and arranged to release each pocket as it registers with the discharge hopper.

The invention will be hereinafter fully set forth and particularly pointed out in the claims.

Figure 1:
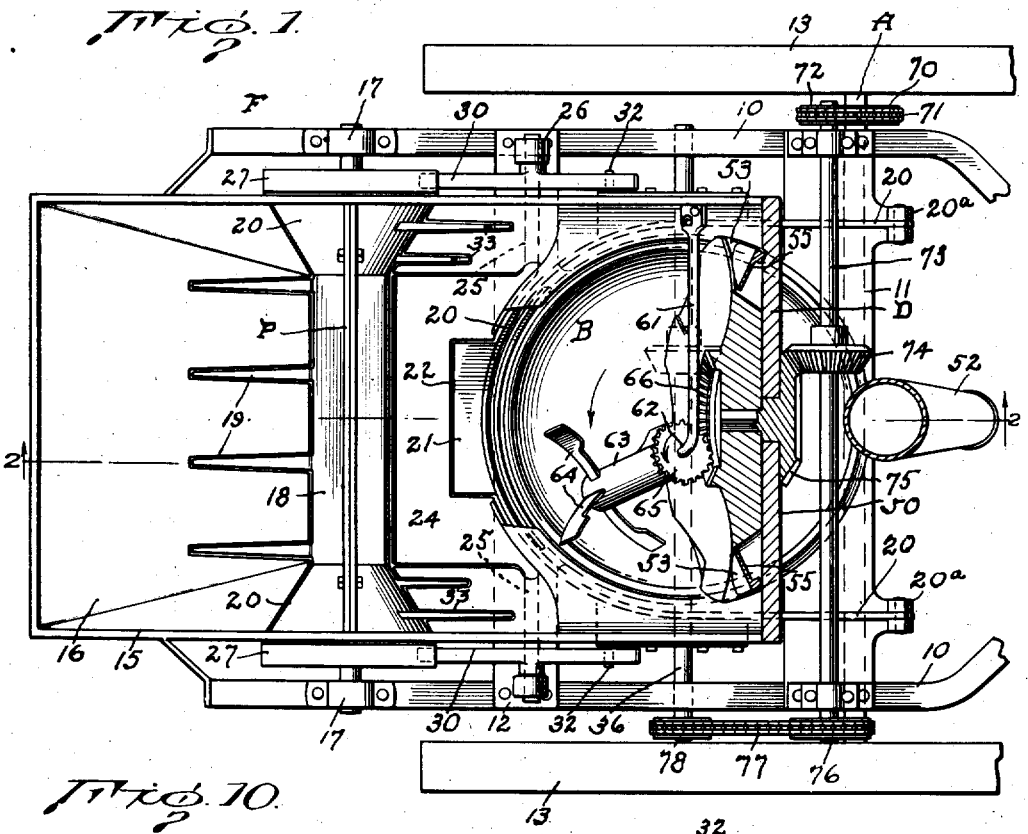
Figure 10:
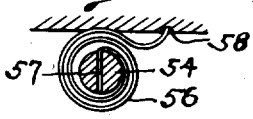
Figure 11:
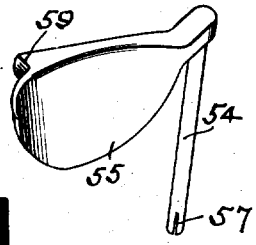
Figure 5:
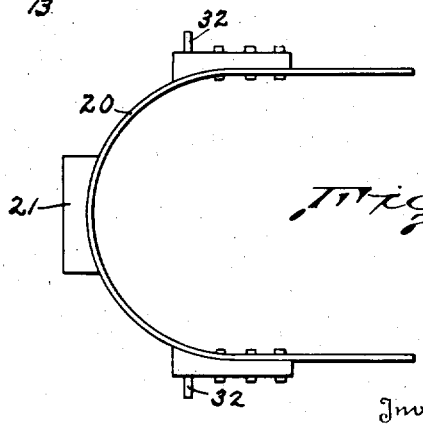
Figure 13:
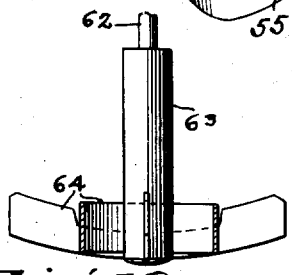
Figure 3:
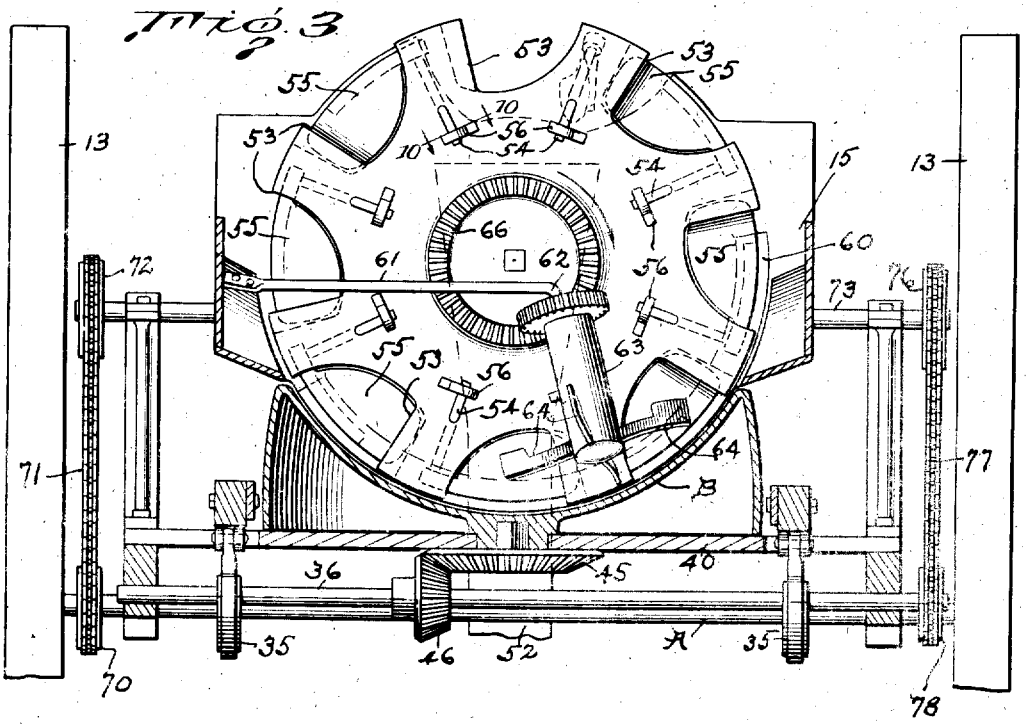
Figure 6:
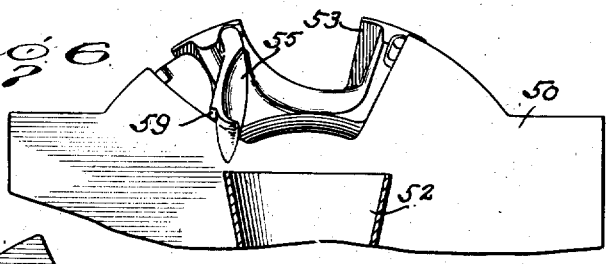
Figure 7:
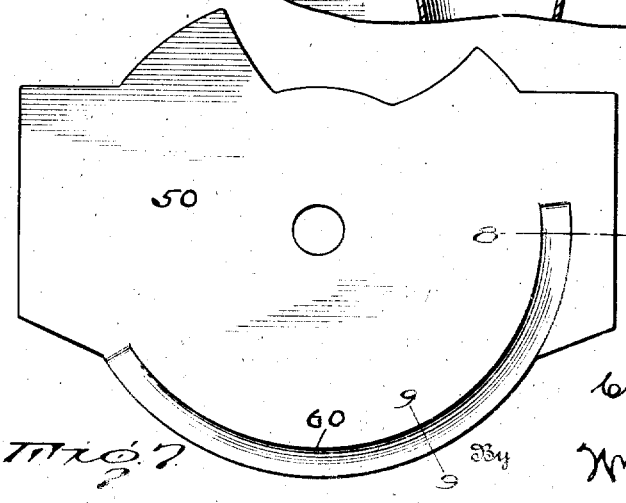
Figure 8:
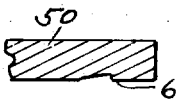
Figure 9:
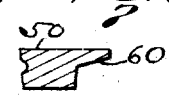

In the accompanying drawings:

Figure 1 is a top plan view of a potato planter constructed in accordance with the invention, parts being shown in section. Figure 2 is a vertical longitudinal, sectional view on the line 2—2, Figure 1. Figure 3 is a similar sectional view taken on the line 3—3, Figure 2, and at right angles to said last mentioned figure. Figure 4 is a detail view illustrating the actuating mechanism for the seed agitator. Figure 5 is a detail plan view of a portion of the seed elevating device. Figure 6 is a detail view of a portion of the carrier wheel showing the spring pressed closure wall of one pocket in the open position to permit the deposit of a seed into the discharge chute. Figure 7 is a detail plan view illustrating the cam for controlling movement of the spring pressed closure walls of the carrier pockets. Figure 8 is a detail sectional view on the line 8—8, Figure 7. Figure 9 is a similar view on the line 9—9, Figure 7, showing different elevations of the cam. Figure 10 is a detail sectional view illustrating the spring device for holding the movable closure walls of the carrier pockets in open position. Figure 11 is a detail perspective view of one of said movable walls and its supporting shaft. Figure 12 is a detail perspective view illustrating the supplemental elevator member. Figure 13 is a vertical elevation partly in section illustrating the device for directing the seed in the receiving bowl to the carrier-pockets.

Referring to the drawings, F designates a supporting frame comprising two laterally spaced rearwardly extended bars 10, united by cross bars 11 and 12, said arms being extended forwardly and provided with suitable means (not shown) for hitching a draft animal thereto. Said arms are provided with aligned journals *a* for a rotatable axle A to which carrier wheels 13 are secured.

Mounted upon the rear portion of the frame 10 is a bin 15 provided with side walls and a downwardly inclined bottom wall 16 extended forwardly from the rear wall of the bin. Mounted transversely of the bin 15 and mounted in bearings 17, on the frame 10 is an oscillatory agitator 18 to which is secured agitator arms 19. The agitator arms may be secured to the agitator in any desired manner. Said agitator is provided with frusto-conical end portions 20.

Extending transversely across the bin 15, from the side walls thereof is a stationary partition plate P, which depends into the bin a sufficient distance to provide a limited space between the lower edge of the plate and the periphery of the agitator 18, so as to limit the number of seed which may pass from the inclined bottom 16 to the feeding mechanism to be later described.

Pivotally supported in bearings 20a carried by the cross bar 11 are the free ends of a U-shape seed-elevating member 20, the bowed portion of which carries an elevating block 21. Said block is movable through a recess 22 formed in the front edge of a supplemental elevator member 24, which is provided with laterally extended arms 25, rotatively mounted in bearings 26 carried by cross-bar 12.

Secured to the outer ends of the agitator shaft 14, at positions outside of the bin 15 are two actuator disks 27, each having a V-shaped recess 28 in its periphery. Each recess is engaged by a pointed end 29 of an actuator 30, which is secured to an arm 25 of the supplemental elevator 24 in such manner that the two will oscillate in unison. The other end of each actuator 30 is forked, as shown at 31, said fork engaging a pin 32 extending laterally from the arms of the seed-elevating member 20. The arrangement is such that up and down movement of said member 20 effects oscillation of the actuators 30, which in turn effects simultaneous oscillation of the agitator 18 and supplemental elevator 24, the raising and lowering of the latter being alternate with the raising and lowering of the elevator member 21, so that as said elevator member is rising, the supplemental elevator 24 is lowering, so as to insure that the seed will move from the supplemental elevator to said elevator block 21. It will be noted that the seed agitator 19 is provided with agitator arms 33 working in the spaces between the ends of the supplemental elevator member 24 and the sides of the bin 15. Movement is imparted to the seed-elevating member by means of eccentrics 35 carried by a shaft 36 rotatably mounted in the frame.

Resting upon the main frame F is a base plate 40, which is provided with an upstanding rear wall 41, which is slightly arcuate in form and serves as the forward end wall of the bin 15. Rotatably mounted within the base plate 40 is a trunnion 42 which carries a seed-receiving bowl B, preferably formed of sheet metal, with its peripheral wall 44 curved to conform to the curvature of the wall 41, the central portion of the bowl being depressed to provide a receptacle for the seeds as they are fed from the bin 15. The trunnion 42 and the bowl B are rotated by means of a bevel gear 45, which meshes with a similar wheel 46 carried by the shaft 36.

Extending upwardly at a fixed position from the interior of the bowl B and inclined backwardly to a certain extent is a back plate 50, in which is rotatably mounted a carrier disk D, so positioned that the lower portion of its periphery extends approximately to the center of the bowl and its upper portion slightly overhangs the receiving end of the feed chute 52. The disk D is provided with a plurality of peripheral openings O, eight of such openings being shown for purposes of illustration. Each opening is provided with an offset lip 53 providing a seed-retaining pocket. Movably mounted in the disk D are a plurality of rock shafts 54, one adjacent to each pocket, each rock shaft carrying a closure member 55 in such position that it is movable into and out of the adjacent pocket. Each closure member is normally biased to open position by means of a spring 56, one end of which is engaged within a slit portion 57 in the shaft 54, and the other being anchored in a stationary position to the disk D, as indicated at 58. Each closure member 55 is provided with a shoulder 59 so positioned as to engage an arcuate cam 60 on a face of the base plate 50, said cam being so arranged as to normally hold each closure member 55 in closed position during portion of the travel of the disk, and to successively release the seeds as the pockets pass over the entrance to the chute 52. Extending laterally from one wall of the hopper and transversely across and above the bowl B is a rod 61 having a downwardly bent portion 62 on which is rotatably mounted the shaft 63 of a feeder provided with arms 64. Said shaft 63 is also provided with a pinion 65 meshing with a bevel gear 66 located at the center of the disk D.

Power for operating the various parts is derived from the traction wheels 13 which are secured to the axle A, said axle carrying a sprocket wheel 70 which is connected by a chain 71 to a second sprocket wheel 72 secured to a shaft 73 which in turn carries a bevel gear 74, the latter meshing with a complemental gear 75 carried by the shaft of the disk D. Also secured to the shaft 73 is a second sprocket wheel 76 which is connected by means of the chain 77 with a sprocket wheel 78 carried by the shaft 36.

In operation, the planter is propelled in any suitable manner, as for instance by horsepower hitched to the machine in the customary manner. As the machine travels the traction wheels 13 rotate the axle A, and through the sprocket wheel connection imparts rotation to the shaft 73, which in turn through the gears 74 and 75 imparts rotative movement to the disk D. At the same time rotation of the disk D is imparted to the feeder shaft 63 through the medium of the complemental gears 65 and 66. Rotation of the shaft 73 also imparts corresponding rotation to the shaft 36 through the sprocket gears 76 and 77, and rotation of said shaft 33 is conveyed to the bowl B by means of the gears 45 and 46. Thus, as the machine travels the disk D and the bowl B are both continuously rotated.

The seeds having been deposited into the bin 15, the planter is ready for operation. As the machine progresses, the disk D and bowl B are rotated in the manner above stated. At the same time, the seed-elevating block 21 is raised and lowered by means of the eccentrics 35, and this movement has a two-fold effect. First, as the block 21 is raised and lowered, the actuators 30 are rocked and impart oscillatory or rocking movements to the agitator 18, and at the same time a corresponding oscillatory movement is imparted to the supplemental elevator 24. By reason of the agitation, the seed resting upon the inclined bottom of the bin 15 are fed forward beneath the partition P onto the body portion of the supplemental elevator 24, the supplemental agitator members 33 serving to prevent the seed from moving laterally off of the supplemental elevator 24. The second effect of the up and down movement of the said elevator block 21 is that said block moves through the recess 22 in the member 24. The range of pivotal movement of the block 21 is such that the top surface thereof moves to a position slightly above the upper edge of the bowl B, the seed having been rolled off of the member 24 onto the top of the block 21, so that as said block reaches its uppermost position its top edge will be slightly inclined to a forward position in a plane above the edge of the bowl B, so that the seeds elevated by block 21 will slide off into the bowl B. As the seeds roll down the side of the bowl the rotation of the latter will cause them to travel to the lowermost portion of the bowl B, so that several seeds will be directed into the lowermost pocket 53 of the disk D by arms 64 of feeder 63, so as to rest against the closure member 55 of a downwardly traveling pocket, said closure member being held in closed position by reason of the engagement of its shoulder 59 with the cam 60, as clearly shown in Figure 2. The depth of the pocket and the inclination of the carrier disk are such that a number of the seeds remain within a pocket as the pocket moves upwardly from the bowl during travel of the disk. As the filled pocket passes the center of bowl B one seed will drop behind the lip of the pocket 53 so as to be carried to the discharging position after closure 55 has moved to open position, the remaining seed falling back into the bowl. As the pocket and the seed carried thereby move upwardly to the topmost position, the shoulder 59 of the closure member 55 rides off of the cam 60, thereby releasing the closure member, so that the latter, under its spring tension will move to open position and permit the deposit of the seed into the chute 52 in the usual manner. It will be understood, of course, that the seed-elevating block 21 picks up a number of seeds each time it is actuated and that the movements of the device 63 and its arms 64 are so timed that the seeds are deposited by said arms in the respective spaces 58 in synchronism with the speed of rotation of carrier D, so that the feed to the chute 52 is practically continuous. Simultaneously with the feeding operation just described, the arms 64 will move any excess seeds toward the opposite side of the bowl so as to prevent clogging. If the feed by member 21 should be too rapid, the action of arms 64 is to force the excess out of the bowl into the bin 15.

The advantages of the invention will be readily understood by those skilled in the art to which it belongs. For instance, an important advantage is that the seeds may be individually fed from a mass of seeds within the bin, and delivered individually to the hopper without damage during the transportation from the bin to the seed chute. A further advantage is that by constructing the seed carrier disk within individual seed-receiving pockets, each pocket having a movable wall which is normally held closed until the time that the seed is to be deposited, the feeding operation may be continuously maintained without damage to the seeds and the control of the feed of individual seeds is effectively accomplished. Another advantage is that the planter is constructed of comparatively few parts and is very simple and inexpensive as to operation, it being readily operated by a single unaided individual.

Having thus explained the nature of the invention and described an operative manner of constructing and using the same, although without attempting to set forth all of the forms in which it may be made, or all of the forms of its use, what is claimed is:

1. A potato planter comprising a frame, a seed-receiving-bin carried thereby, a seed-receiving-bowl having its upper edge above the plane of the bottom of said bin, means for periodically elevating seeds from the bin to a position above the top edge of the receiving bowl, a seed-discharge-chute having its inlet end in a higher plane than that of the seed-receiving-bowl, and means located at a fixed position within said bowl for individually transferring seeds from the interior of the bowl to the inlet end of the chute.

2. A potato planter comprising a frame, a seed-receiving-bin carried thereby, a seed-receiving-bowl having its upper edge above the plane of the bottom of said bin, a yoke having arms pivoted to said frame, a seed-elevating block carried by the yoke and movable through a space between the bowl and the bottom of the bin, a seed-discharge-chute having its inlet end in a higher plane than that of said seed-receiving-bowl, means located at a fixed position within said bowl for individually transferring seed from the interior of the bowl to the inlet end of the discharge chute, and means for raising and lowering the yoke, so that the seeds are elevated from the bin by said elevating block to a position above the top edge of the receiving-bowl.

3. A potato planter comprising a frame, a seed-receiving bin carried thereby, a seed-receiving bowl having its upper edge above the plane of the bottom of said bin, a seed-elevating block, a supplemental elevator member between said bin and said bowl, means for periodically raising and lowering the seed-elevating block through said supplemental elevator member and for simultaneously lowering and raising the latter, so that the elevating block and the supplemental elevator member move up and down in alternate relation with respect to each other, a discharge chute, and means for individually transferring the seed from said bowl to the inlet of said chute.

4. A potato planter comprising a frame, a seed-receiving bin carried thereby, a seed-receiving bowl having its edge above the plane of the bottom edge of the bin, a discharge chute, means for individually transferring seed from the bowl to the inlet end of said discharge chute, a supplemental elevator member interposed between the bin and said bowl, a yoke having its arms pivoted to said frame, a seed-elevating block carried by the yoke and positioned between the bowl and the supplemental elevator member, cams for raising and lowering the yoke so that the seed-elevating block raises the seeds from the bin to a position above the top edge of the receiving bowl, and means operated by movement of said yoke for raising and lowering said auxiliary elevator member so as to deposit seeds upon said elevating block.

5. A potato planter comprising a frame, a receiving bin carried thereby, a horizontally disposed receiving bowl having its upper edge above the plane of the bottom of said bin, a discharge chute, means for individually transferring the seed from said bowl to the inlet end of the chute, a supplemental elevator member pivoted to the frame and movable through a position between the bin and the bowl, a seed-elevating member having a portion movable through a recess in the supplemental elevator member, in such manner as to receive seeds from the supplemental elevator member and elevate them to a position above the top edge of the receiving bowl, an agitator for the bin, and actuating means for said agitator, said actuator means being connected with and operable by the seed-elevating member, said supplemental elevator member being connected to and movable with said actuator member.

6. A potato planter comprising a frame, a rotatable seed-receiving bowl, a carrier disk having peripheral seed-receiving pockets therein, said disk being rotatably mounted on an inclined axis in such position that the lower portion thereof travels within the bowl, movably mounted closure walls adapted to close the rear portions of the respective pockets, there being one closure wall for each pocket, means for rotating said disk and said bowl, means acting to normally move said closure walls to open position, and means for temporarily holding said walls in closed position until each pocket reaches a predetermined position during rotation of the disk.

7. A potato planter comprising a frame, a rotatable seed-receiving bowl, a carrier disk having peripheral recesses therein, said disk being rotatably mounted on an inclined axis in such position that the lower portion thereof travels within the bowl, movably mounted closure walls carried by said disk and adapted to close the rear portions of the respective pockets, there being one closure wall for each pocket, means for rotating said seed bowl and said disk, means acting to normally move said closure walls to open position, and a rib-like cam member positioned to engage the respective closure walls, said cam being of such a length as to hold said walls in closed position until each pocket reaches a predetermined position during rotation of the disk.

8. A potato planter comprising a frame, a rotatable seed-receiving bowl, a carrier disk having peripheral recesses therein, said disk being rotatably mounted on an inclined axis in such position that the lower portion thereof travels within the bowl, movably mounted closure walls adapted to close the rear portions of the respective pockets, there being one closure wall for each pocket, means for rotating said seed-bowl and said disk, means acting to normally move said closure walls to open position, each of said closure walls having a shoulder formed on the back thereof, and an arcuate cam positioned back of said disk and concentric with the axis of rotation of the latter, said cam being positioned to engage the shoulders of the respective closure walls, said cam also being of such length as to hold the walls in closed position until each pocket reaches a predetermined position during rotation of the disk.

9. A potato planter comprising a frame, a rotatable seed-receiving bowl, a carrier disk having peripheral recesses therein, said disk being rotatably mounted on an inclined axis in such position that the lower portion thereof travels within the bowl, movably mounted closure walls adapted to close the rear portions of the respective pockets, there being one closure wall for each pocket, means for rotating said bowl and said disk, means acting to normally move said closure walls to open position, means for holding said closure wall in closed position until each pocket reaches a predetermined position during rotation of said disk, and means for directing individual seeds into the respective pockets as they reach the lowermost position within the bowl.

10. A potato planter comprising a frame, a seed-receiving bowl carried thereby, a carrier disk having peripheral recesses therein, means for rotating said carrier disk and said bowl, said disk being mounted to rotate on an inclined axis in such position that the lower portion thereof travels through the bowl adjacent the center thereof, rock shafts pivotally mounted in said disk adjacent the respective pockets, closure walls carried by the respective shafts in such position as to be movable into said pockets, means maintaining a yieldable tension upon said shafts in such manner as to tend to move the closure walls out of the pockets, and means for holding said closure walls in closed position against the tension of the spring pressure until each pocket reaches a predetermined position during rotation of the disk.

11. A potato planter comprising a frame, a seed-receiving bin carried thereby, a rotatably mounted seed-receiving bowl supported by said frame and having its upper edge above the plane of the bottom of the bin, means for periodically elevating individual seeds from the bin and depositing them into said bowl, a carrier disk rotatably supported in a position to extend into said bowl, said carrier disk having peripheral recesses therein, movably mounted closure walls positioned to be movable into and out of the respective pockets, there being one closure wall for each pocket, means acting to normally move said walls to open position, and means for temporarily holding said walls in closed position until each pocket reaches a predetermined position during rotation of the disk.

12. A potato planter comprising a frame, a seed bin carried thereby, a seed-receiving bowl adjacent said bin, a carrier disk having peripheral pockets therein, said disk being rotatably mounted on an inclined axis in such position that the lower portion travels through said bowl, means for imparting rotative movements to said disk and to said bowl, an elevator member having means for raising seeds from said bin and delivering them to said bowl, closure walls for the respective recesses of the carrier disk, said walls being movably mounted in such positions as to be movable into and out of the respective pockets, means acting to independently move said walls to normally open position, and means for holding said walls in closed position until each pocket reaches a predetermined position during rotation of the disk.

13. A potato planter comprising a frame, a seed bin carried thereby, a rotatable seed-receiving bowl having its upper edge above the plane of the bottom of said bin, a seed-elevating member having means for periodically elevating the seeds to a position above the top edge of the receiving bowl so as to deposit them into the latter, a supplemental elevator member movable within the bin in such manner as to direct the seeds onto the seed-elevating member, a carrier disk having peripheral recesses therein, said disk being rotatably mounted on an inclined axis in such position that the lower portion thereof travels within the bowl, means for imparting rotative movements to the receiving bowl and to the carrier disk, movable walls mounted on the carrier disk and so positioned as to operate within the respective pockets, means acting to normally move said walls to open position, and means for holding said walls in closed position until each pocket reaches a predetermined position during rotation of the disk.

14. A potato planter comprising a frame, a seed-bin carried thereby, a rotatable seed-receiving bowl having its upper edge above the plane of the bottom of said bin, means for periodically elevating the seeds from the bin to a position above the top edge of the receiving bowl so as to discharge them into said bowl, a carrier disk having peripheral recesses therein, said disk being rotatably mounted on an inclined axis in such position that the lower portion thereof will travel within said bowl, means for retaining the seeds within the respective pockets, means for releasing the retaining means of each pocket when said pocket reaches a predetermined position during rotation of the disk, a drive shaft carried by said frame, a counter shaft actuated thereby, and means driven by the counter shaft for imparting rotative movements to the bowl and to the disk.

15. A potato planter comprising a frame, a seed-bin carried thereby, a rotatable seed-receiving bowl having its upper edge above the plane of the bottom of said bin, means for periodically elevating the seeds from the bin to a position above the top edge of the receiving bowl, so as to discharge them into said bowl, a carrier disk having peripheral recesses therein, said disk being rotatably mounted on an inclined axis in such position that the lower portion thereof will travel within said bowl, means for retaining the seeds within the respective pockets, means for releasing the retaining means of each pocket when said pocket reaches a predetermined position during rotation of the disk, eccentrics engaging and operating said seed-elevating means, a drive shaft, a counter shaft actuated thereby, driving means connecting said counter shaft and said disk, means operated by said counter shaft and for actuating said eccentrics, and means actuated by the eccentric-operating means for imparting rotation to said bowl.

16. A potato planter comprising a frame, a seed-bin carried thereby, a rotatable seed-receiving bowl having its upper edge above the plane of the bottom of said bin, means for periodically elevating the seeds from the bin to a position above the top edge of the receiving bowl, so as to discharge them into said bowl, a carrier disk having peripheral recesses therein, said disk being rotatably mounted on an inclined axis in such position that the lower portion thereof will travel within said bowl, means for temporarily retaining the seeds within the respective pockets, means for releasing the seed-retaining means of each pocket when said pocket reaches a predetermined position during rotation of the disk, a counter shaft, eccentrics on said shaft and connected with said seed-elevating member, a drive shaft, a second counter shaft actuated thereby, driving means connecting the last mentioned counter shaft and said carrier disk, driving means connecting said counter shafts, means operated by the first-mentioned counter shaft for imparting rotation to said bowl, a seed agitator operable within said bowl, and a gearing connection between said carrier disk and said agitator.

17. A potato planter comprising a frame, a seed-bin carried thereby, a rotatable seed-receiving bowl having its upper edge above the plane of the bottom of said bin, an oscillatory agitator located in said bin, means for periodically elevating the seeds from the bin to a position above the top edge of the receiving bowl, so as to deposit the seed into the latter, means connected with said seed-elevating means for oscillating said agitator, a carrier disk having peripheral recesses therein, said disk being mounted in an inclined axis in such position that the lower portion thereof travels within said bowl, closure means for the respective pockets, means acting to normally maintain the closure means in open position, means for temporarily holding said closure means in closed position until each pocket reaches a predetermined position during rotation of the disk.

18. A potato planter comprising a frame, a seed-bin carried thereby, a rotatable seed-receiving bowl having its upper edge above the plane of the bottom of said bin, an oscillatory agitator located in said bin, means for periodically elevating the seeds to a position above the top edge of the receiving bowl, so as to deposit the seed into the latter, means connected with said seed-elevating means for actuating said agitator, a carrier disk having peripheral recesses therein, said disk being mounted in an inclined axis in such position that the lower portion thereof travels within said bowl, closure means for the respective recesses, means acting to normally maintain the respective closure means in open position, means for temporarily holding said respective closure means in closed position until each recess reaches a predetermined position during rotation of the disk, a supplemental elevator for transferring seeds from the bin to said seed-elevating means, and means connected with said last mentioned means for actuating the supplemental elevator.

19. A potato planter comprising a frame, a seed-bin carried thereby, a rotatable seed-receiving bowl having its upper edge above the plane of the bottom of said bin, an oscillatory agitator located in said bin, means for periodically elevating the seeds to a position above the top edge of the receiving bowl, so as to deposit the seed into the latter, means connected with said elevator for actuating said agitator, a carrier disk having peripheral recesses therein, said disk being mounted in an inclined axis in such position that the lower portion thereof travels within said bowl, closure means for the respective pockets, means acting to normally maintain the closure means in open position, means for holding said closure means in closed position until each pocket reaches a predetermined position during rotation of the disk, end disks secured to said agitator, seed-elevating members for lifting individual seeds to a position above the top edge of said bowl, so as to deposit the seed into the latter, pivoted detents engaging the peripheries of said end disks, each detent having a forked end, pins carried by the seed-elevating member and engaging the respective forked ends of the actuators, a supplemental elevator member for transferring seeds from said bin to said seed-elevating member, and means connecting the supplemental elevator and said detents in such manner that the detents also impart movements to the supplemental elevator member.

20. In a planter, a rotatively mounted seed-receiving bowl, a rotatively mounted seed carrier positioned in a plane at an angle to the plane of rotation of said bowl, and having its lower portion extended into the bowl, said seed carrier having circumferentially positioned seed-receiving pockets, and means for imparting concurrent rotation to said seed bowl and said carrier, whereby rotation of the bowl will direct the seed to the seed carrier, and the latter will lift the seed from said bowl.

21. In a planter, a rotatively mounted horizontally disposed seed-receiving bowl, a vertically disposed seed carrier rotatively mounted in a vertical plane with its lower portion within and adjacent to the bottom of said bowl, said seed carrier having circumferentially positioned seed-receiving pockets, and means for concurrently rotating the said seed bowl and said seed carrier, whereby rotation of the bowl will direct seed to the lower portion of the seed carrier, and the latter will convey the seed upwardly out of the seed bowl.

22. In a planter, a rotatively mounted seed-receiving bowl, a fixed back plate mounted in an upright inclined position with its lower portion extended into said bowl, means for supplying seed to said bowl, a seed carrier rotatively mounted on said back plate to travel over one surface thereof, said seed carrier having a portion extended into said bowl to a position adjacent the bottom of the latter, said seed carrier also having circumferentially positioned seed-receiving pockets, and means for imparting concurrent rotations to said seed bowl and said seed carrier, whereby rotation of the seed bowl will direct seed into the pockets of the seed carrier, and the latter will carry said seed out of said bowl.

CHARLES F. SCHMIDT.